(12) United States Patent
Lagare

(10) Patent No.: US 7,231,812 B1
(45) Date of Patent: Jun. 19, 2007

(54) CONDUIT BREACH LOCATION DETECTOR

(76) Inventor: Michael E. Lagare, 1583 Upper Maple St., Dayville, CT (US) 06241

( * ) Notice: Subject to any disclaimer, the term of this patent is extended or adjusted under 35 U.S.C. 154(b) by 0 days.

(21) Appl. No.: 11/260,957

(22) Filed: Oct. 27, 2005

(51) Int. Cl.
*G01M 3/14* (2006.01)
*G01M 3/28* (2006.01)
*B08B 9/02* (2006.01)

(52) U.S. Cl. .................. 73/40.5 R; 73/49.4; 73/49.5; 15/104.05; 15/104.062

(58) Field of Classification Search ............... 73/40, 73/40.5 R, 46, 49.5, 592, 865.8; 15/104.03, 15/104.05, 104.061–104.063
See application file for complete search history.

(56) References Cited

U.S. PATENT DOCUMENTS

| | | | | |
|---|---|---|---|---|
| 616,696 | A | * | 12/1898 | Cochran ...................... 15/3.51 |
| 1,006,261 | A | * | 10/1911 | Mueller .................. 15/104.062 |
| 1,089,641 | A | * | 3/1914 | Hodgman et al. ..... 15/104.062 |
| 2,884,624 | A | * | 4/1959 | EnDean et al. ............. 340/605 |
| 3,541,837 | A | * | 11/1970 | Davis et al. .................. 73/1.18 |
| 3,778,613 | A | * | 12/1973 | Dorgebray ................... 250/303 |
| 3,817,086 | A | * | 6/1974 | Dorgebray ............... 73/40.5 R |
| 3,974,680 | A | * | 8/1976 | Beaver ..................... 73/40.5 R |
| 4,020,674 | A | * | 5/1977 | Fechter et al. ........... 73/40.5 R |
| 4,051,714 | A | * | 10/1977 | Fechter et al. ........... 73/40.5 A |
| 4,083,074 | A | * | 4/1978 | Curtis ................... 15/104.061 |
| 5,084,764 | A | * | 1/1992 | Day ............................ 348/84 |
| 5,186,757 | A | * | 2/1993 | Abney, Sr. ............. 15/104.062 |
| 6,401,525 | B1 | * | 6/2002 | Jamieson ................. 73/40.5 R |
| 2002/0059687 | A1 | * | 5/2002 | Smith et al. ........... 15/104.062 |
| 2004/0261547 | A1 | * | 12/2004 | Russell et al. ............. 73/865.8 |

FOREIGN PATENT DOCUMENTS

WO    WO 9724194 A1 * 7/1997

* cited by examiner

*Primary Examiner*—Hezron Williams
*Assistant Examiner*—David A. Rogers

(57) ABSTRACT

A conduit breach location detector for detecting leaks in a conduit is disclosed. The conduit breach location detector includes a shuttle cage for connection to the conduit. A sounding shuttle is provided in the shuttle cage. A sounding cable may be connected to the sounding shuttle. A pressurization system is connected to the shuttle cage for pressurizing the shuttle cage and pushing the sounding shuttle through the conduit.

20 Claims, 2 Drawing Sheets

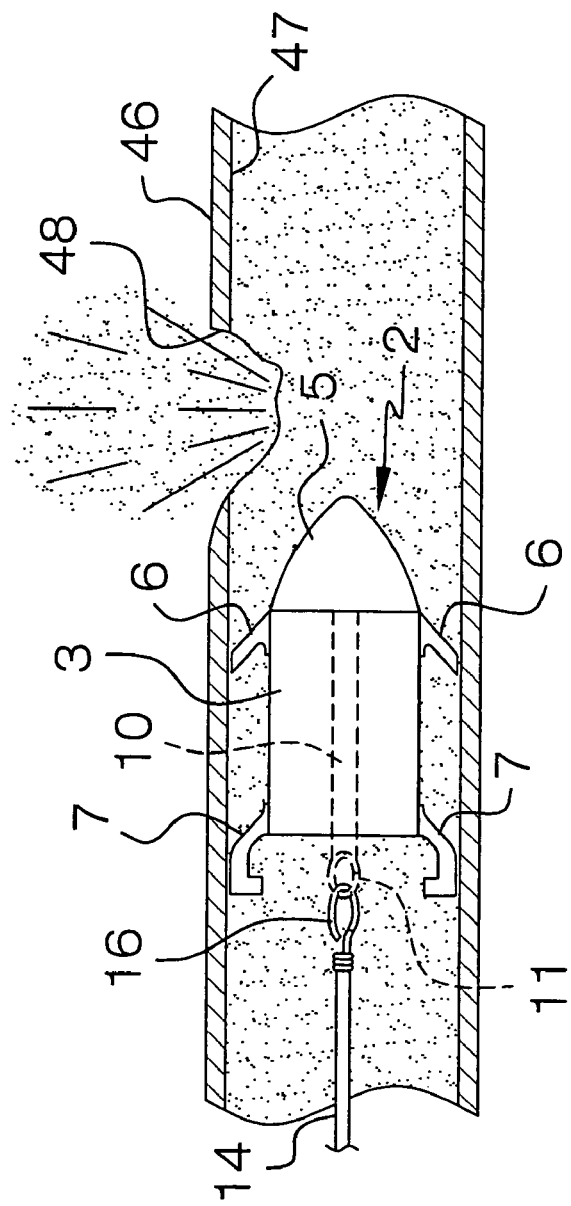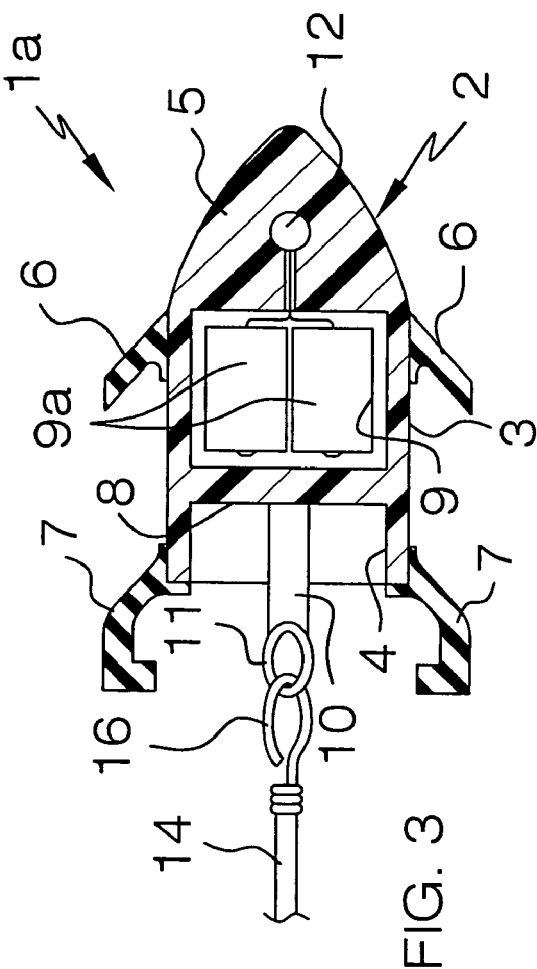

CONDUIT BREACH LOCATION DETECTOR

FIELD OF THE INVENTION

The present invention relates to devices for detecting breaches in conduits. More particularly, the present invention relates to a conduit breach location detector which is suitable for detecting the location of a breach in a pipe or other conduit.

BACKGROUND OF THE INVENTION

Over time, underground utility conduits frequently develop leaks which cause water or gas to leak from the conduit. However, it is often difficult for repair personnel to determine the precise location of a breach in a conduit such that the conduit can be repaired in a timely and efficient manner. Therefore, what is needed is a conduit breach location detector which is capable of detecting the location of a breach in a conduit to facilitate expeditious and efficient repair or replacement of the conduit.

SUMMARY OF THE INVENTION

A conduit breach location detector for detecting leaks in a conduit is disclosed. The conduit breach location detector includes a shuttle cage for connection to the conduit. A shuttle is provided in the shuttle cage. A cable may be connected to the shuttle. A pressurization system is connected to the shuttle cage for pressurizing the shuttle cage and pushing the shuttle through the conduit.

BRIEF DESCRIPTION OF THE DRAWINGS

The present invention will now be described, by way of example, with reference to the accompanying drawings, in which:

FIG. 2 is a longitudinal sectional view of a segment of a conduit, more particularly illustrating advancement of a shuttle element of the conduit breach location detector through the conduit as the shuttle approaches a breach in the conduit; and FIG. 3 is a cross-sectional view of a shuttle according to an alternative embodiment of the conduit breach location detector.

DETAILED DESCRIPTION OF THE INVENTION

Figure 1:
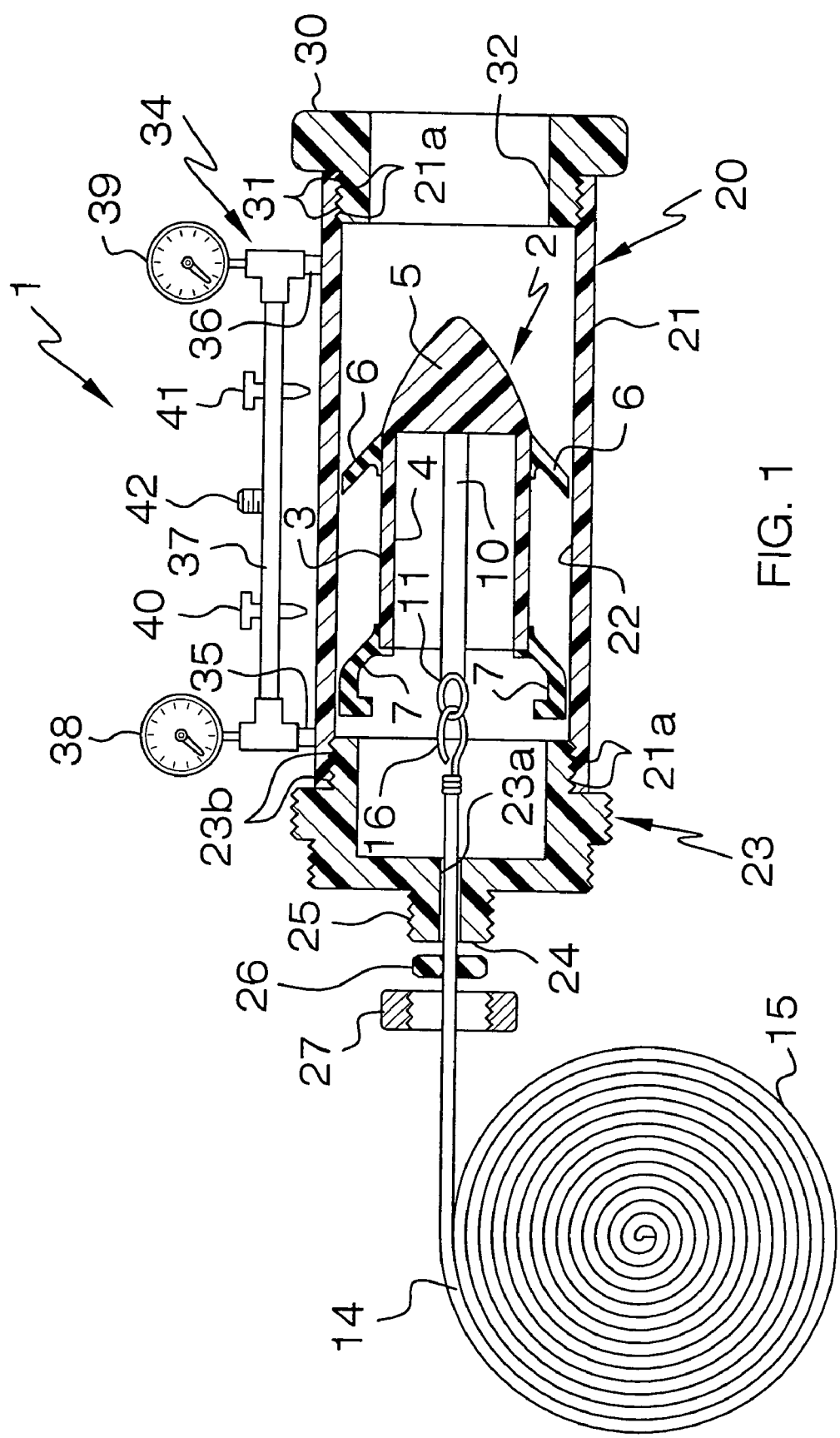
FIG. 1 is a cross-sectional view of an illustrative embodiment of the conduit breach location detector according to the present invention.

Referring initially to FIGS. 1 and 2 of the drawings, an illustrative embodiment of the conduit breach location detector, hereinafter detector, according to the present invention is generally indicated by reference numeral 1. As shown in FIG. 1, the detector 1 includes a shuttle 2. The shuttle 2 includes a shuttle housing 3 which may have a generally elongated, cylindrical configuration and includes a housing interior 4. A housing tip 5, which may have a tapered shape, as shown, terminates the front end of the shuttle housing 3.

Multiple fins extend from the shuttle housing 3. For example, multiple front fins 6 may extend from the shuttle housing 3, adjacent to the housing tip 5, and multiple rear fins 7 may extend from the shuttle housing 3, adjacent to the rear end of the shuttle housing 3. The front fins 6 and rear fins 7 may be pivotally attached to the shuttle housing 3.

A cable 14, which may be dispensed from a wound cable reel 15, is attached to the shuttle 2, using any of a variety of techniques known to those skilled in the art. For example, an elongated attachment rod 10 may extend from the housing tip 5, rearwardly through the housing interior 4, as shown. An attachment eye 11 is provided on the attachment rod 10, and a shuttle attachment hook 16 provided on the end of the cable 14 engages the attachment eye 11.

The shuttle 2 may be used in conjunction with a shuttle cage 20, as will be hereinafter further described. The shuttle cage 20 typically includes an elongated, generally cylindrical cage housing 21 having a cage housing interior 22. Interior housing threads 21a may be provided at the front and rear ends of the cage housing 21. A rear compression fitting 23 is removably fitted in the rear end of the cage housing 21. Accordingly, the rear compression fitting 23 may be provided with exterior housing threads 23b which threadibly engage the interior housing threads 21a of the cage housing 21. A nipple 24, having exterior nipple threads 25, extends from the rear compression fitting 23. A cable opening 23a extends through the rear compression fitting 23 and nipple 24. Therefore, the cable 14 extends from the cable reel 15, through the cable opening 23a and into the cage housing interior 22, where the cable 14 attaches to the shuttle 2. A nut 27 typically threadibly engages the nipple threads 25 on the nipple 24, and an O-ring 26 provides an airtight seal between the nut 27 and the cable 14.

A front compression fitting 30 is provided on the front end of the cage housing 21. Accordingly, fitting threads 31 are typically provided on the exterior of the front compression fitting 30 for engaging the interior housing threads 21a at the front end of the cage housing 21. A fitting opening 32 extends through the front compression fitting 30 and communicates with the cage housing interior 22. The front compression fitting 30 is further provided with interior or exterior threads (not shown) which are adapted to engage conduit threads (not shown) provided on a conduit 46 (FIG. 2) having a breach 48 in typical use of the detector 1, as will be hereinafter described.

As further shown in FIG. 1, a pressurization system 34 is provided on the shuttle cage 20. The pressurization system 34 includes a rear inlet conduit 35 and a front inlet conduit 36 which are provided in fluid communication with the cage housing interior 22. A connecting conduit 37 establishes fluid communication between the rear inlet conduit 35 and the front inlet conduit 36. A rear pressure gauge 38 and a front pressure gauge 39 are provided in fluid communication with the rear inlet conduit 35 and the front inlet conduit 36, respectively. A rear valve 40 and a front valve 41 are provided in the connecting conduit 37, in spaced-apart relationship to each other. An inlet nipple 42 is provided in fluid communication with the connecting conduit 37, between the rear valve 40 and the front valve 41.

In typical operation of the invention, the detector 1 is used to determine the location of a breach 48 in a conduit 46, such as a water or gas utility conduit, for example, as shown in FIG. 2. Accordingly, the front compression fitting 30 of the shuttle cage 20 is initially connected to the end (not shown) of the conduit 46, which has generally the same diameter as the diameter of the cage housing 21. The shuttle 2 is positioned in the cage housing interior 22 of the cage housing 21 such that the rear fins 7 of the shuttle 2 are positioned forwardly of the rear inlet conduit 35 of the pressurization system 34. An air or water supply (not shown) is connected to the inlet nipple 42 of the pressurization system 34. Next, the rear valve 40 is closed and the front valve 41 is opened. Air or water (not shown) is introduced into the cage housing interior 22 through the inlet nipple 42, the connecting conduit 37 and the front inlet conduit 36, respectively. After pressure in the conduit interior 47 of the conduit 46 equalizes with that in the cage housing interior 22, the pressure on the front pressure gauge 39 is noted. The front valve 41 is then closed and the rear valve 40 is opened, thereby facilitating the flow of air or water into the cage housing interior 22 through the rear inlet conduit 35. Consequently, the air or water pressure behind the shuttle 2 pushes against the front fins 6 and the rear fins 7, thereby expanding or pivoting the front fins 6 and rear fins 7 outwardly and advancing the shuttle 2 forwardly from the cage housing interior 22, through the fitting opening 22 of the front compression fitting 30 and into the conduit interior 47 of the conduit 46, respectively. The pressure in the cage housing interior 22 is regulated such that the reading on the rear pressure gauge 38 matches the pressure reading which was initially noted on the front pressure gauge 39.

As it advances through the conduit interior 47 of the conduit 46, the shuttle 2 approaches a breach 48 in the conduit 46. As the rear fin 7 of the shuttle 2 passes the breach 48, the pressure in the conduit interior 47 drops since the air or gas exits the conduit interior 47 through the breach 48. Consequently, the shuttle 2 stops in the conduit interior 47, just beyond the breach 48. The drop in pressure in the conduit interior 47 registers on the rear gauge 38. The location of the breach 48 in the conduit 46 is noted by noting the length of cable 14 which was drawn from the cable reel 15 by the shuttle 2. Therefore, the distance of the conduit breach 48 from the end of the conduit 46 to which the shuttle cage 20 is attached corresponds to the length of the cable 14 which was drawn from the cable reel 15 and into the conduit interior 47. This allows personnel to repair the conduit 46.

Referring next to FIG. 3, in an alternative embodiment of the conduit breach location detector, generally indicated by reference numeral 1a, a rod attachment wall 8 spans the housing interior 4. A battery compartment 9 is provided forwardly of the housing interior 4 in the shuttle housing 3. The attachment rod 10 extends rearwardly from the rod attachment wall 8. A transmitter 12 is provided in the housing tip 5, and batteries 9a are provided in the battery compartment 9. Accordingly, the location of the shuttle 2 in the conduit interior 47 of the conduit 46 is monitored by the transmission of electromagnetic signals from the transmitter 12 to a receiver (not shown) provided at the entry of the conduit 46 rather than by noting the length of cable 14 which is drawn into the conduit interior 47. It is to be understood that the cable 14 may optionally be omitted from the shuttle 2 of the detector 1a as a technique to measure the location of the conduit breach 48 from the end of the conduit 46.

While the preferred embodiments of the invention have been described above, it will be recognized and understood that various modifications can be made in the invention and the appended claims are intended to cover all such modifications which may fall within the spirit and scope of the invention.

What is claimed is:

1. A conduit breach location detector for detecting leaks in a conduit, comprising:
   a shuttle cage for connecting to the conduit;
   a shuttle provided in said shuttle cage;
   a rear pressure gauge attached to the shuttle cage for measuring the pressure in the rear of the shuttle;
   a front pressure gauge attached to the shuttle cage for measuring the pressure in the front of the shuttle when said shuttle is in located in said shuttle cage;
   a cable connected to said shuttle; a length of said cable determines the location of the leak; and
   a pressurization system connected to said shuttle cage for pressurizing said shuttle cage and pushing said shuttle though the conduit, wherein said rear and front pressure gauges provide pressure data indicative of a leak near said shuttle as said shuttle travels through said conduit.

2. The detector of claim 1 further comprising a plurality of fins carried by said shuttle.

3. The detector of claim 2 wherein said plurality of fins comprises a plurality of front fins and a plurality of rear fins.

4. The detector of claim 1 wherein said pressurization system comprises at least one inlet conduit connected to said shuttle cage and an inlet nipple provided in fluid communication with said at least one inlet conduit.

5. The detector of claim 4 further comprising at least one valve provided between said at least one inlet conduit and said inlet nipple.

6. The detector of claim 5 further comprising at least one pressure gauge provided in fluid communication with said at least one inlet conduit.

7. The detector of claim 1 wherein said shuttle comprises a shuttle housing and a tapered tip provided on said shuttle housing.

8. The detector of claim 7 further comprising an attachment rod carried by said shuttle housing and wherein said cable is connected to said attachment rod.

9. The detector of claim 1 wherein the shuttle comprises:
   a shuttle housing having an interior and a housing tip provided on said shuttle housing;
   a rod attachment wall provided in said housing interior;
   a battery compartment within said shuttle and containing a power source;
   wherein the rod attachment wall defines a wall of the battery compartment;
   an attachment rod carried by said rod attachment wall; and
   a transmitter carried by said shuttle housing and connected to said power source;
   said transmitter provided a signal indicative of the location of said leak.

10. The detector of claim 9 further comprising a plurality of fins carried by said shuttle housing.

11. The detector of claim 10 wherein said plurality of fins comprises a plurality of front fins and a plurality of rear fins.

12. The detector of claim 9, comprising a receiver for receiving signals from said transmitter.

13. A conduit breach location detector for detecting leaks in a conduit, comprising:
   a shuttle cage for connecting to the conduit;
   a shuttle provided in said shuttle cage;
   a shuttle provided in said shuttle cage;
   a rear pressure gauge attached to the shuttle cage for measuring the pressure in the rear of the shuttle;
   a front pressure gauge attached to the shuttle cage for measuring the pressure in the front of the shuttle when said shuttle is in located in said shuttle cage;
   a cable connected to said shuttle; a length of said cable determines the location of the leak;
   a pressurization system having a pair of inlet conduits connected to said shuttle cage, a connecting conduit connecting said pair of inlet conduits, an inlet nipple connected to said connecting conduit; and
   a pair of valves connected to said connecting conduit on respective sides of said inlet nipple for pressurizing said shuttle cage and pushing said shuttle through the conduit, wherein said rear and front pressure gauges provide pressure data indicative of a leak near said shuttle as said shuttle travels through said conduit.

14. The detector of claim 13 wherein said shuttle cage comprises an elongated, generally cylindrical cage housing having a cage housing interior.

15. The detector of claim 13 further comprising a pair of pressure gauges connected to said pair of inlet conduits, respectively.

16. The conduit breach location detector of claim 13 further comprising a plurality of fins carried by said shuttle.

17. The detector of claim 16 wherein said plurality of fins comprises a plurality of front fins and a plurality of rear fins.

18. The detector of claim 13 wherein said shuttle comprises a generally elongated, cylindrical shuttle housing having a housing interior and a tapered tip provided on said shuttle housing.

19. The detector of claim 18 further comprising an attachment rod carried by said shuttle housing and wherein said cable is connected to said attachment rod.

20. The detector of claim 19 wherein said attachment rod extends through said housing interior of said shuttle housing.

* * * * *